US012684669B2

(12) United States Patent
Wang et al.

(10) Patent No.: US 12,684,669 B2
(45) Date of Patent: Jul. 14, 2026

(54) LIGHTING DEVICE

(71) Applicant: DELTA ELECTRONICS, INC., Taoyuan City (TW)

(72) Inventors: Chih-Hsien Wang, Taoyuan City (TW); Kuan-Hsien Tu, Taoyuan City (TW); Kai-Wei Chen, Taoyuan City (TW); Ming-Chieh Cheng, Taoyuan City (TW)

(73) Assignee: DELTA ELECTRONICS, INC., Taoyuan City (TW)

(*) Notice: Subject to any disclaimer, the term of this patent is extended or adjusted under 35 U.S.C. 154(b) by 101 days.

(21) Appl. No.: 18/511,514

(22) Filed: Nov. 16, 2023

(65) Prior Publication Data

US 2024/0172347 A1 May 23, 2024

Related U.S. Application Data

(60) Provisional application No. 63/384,234, filed on Nov. 18, 2022.

(51) Int. Cl.

| | |
|---|---|
| ***H05B 45/59*** | (2022.01) |
| ***H05B 45/325*** | (2020.01) |
| ***H05B 45/345*** | (2020.01) |
| ***H05B 45/40*** | (2020.01) |

(52) U.S. Cl.
CPC ........... *H05B 45/59* (2022.01); *H05B 45/325* (2020.01); *H05B 45/345* (2020.01); *H05B 45/40* (2020.01)

(58) Field of Classification Search
CPC ........ H05B 45/30; H05B 45/37; H05B 45/40; H05B 45/59; H05B 45/325; H05B 45/335; H05B 45/345; H05B 45/355; H05B 45/375; H05B 45/385; H05B 47/155
See application file for complete search history.

(56) References Cited

U.S. PATENT DOCUMENTS 8,941,323 B1* 1/2015 Wu ...................... H05B 45/395 315/192
11,922,892 B2* 3/2024 Liu .................... G02B 27/0172
2006/0220586 A1* 10/2006 Latham .................. H05B 45/46 315/185 S (Continued)

FOREIGN PATENT DOCUMENTS

CN 103260313 A 8/2013
CN 103889495 A 6/2014

(Continued)

*Primary Examiner* — Tung X Le
(74) *Attorney, Agent, or Firm* — CKC & Partners Co., LLC

(57) ABSTRACT

A lighting device includes a driver, a first light string, a second light string, a constant current controller and a pulse width modulation controller. The driver is configured to provide a DC driving current to a shunt node. The first light string is electrically coupled between the shunt node and a ground terminal, and the first light string is driven by a first pulsating direct current. The second light string and the constant current controller are electrically coupled in series between the shunt node and the ground terminal. The pulse width modulation controller is configured to provide a pulse signal to the constant current controller, and the constant current controller controls a pulse frequency of a second pulsating direct current supplied for the second light string according to the pulse signal.

19 Claims, 10 Drawing Sheets

(56) References Cited

U.S. PATENT DOCUMENTS

| | | | | |
|---|---|---|---|---|
| 2011/0128303 | A1* | 6/2011 | Yonemaru | H05B 45/46 315/291 |
| 2011/0156605 | A1* | 6/2011 | Ku | H05B 45/46 315/186 |
| 2011/0234109 | A1* | 9/2011 | Chiu | H05B 45/20 315/185 R |
| 2012/0200229 | A1* | 8/2012 | Kunst | H05B 45/385 315/186 |
| 2012/0206054 | A1 | 8/2012 | Kim | |
| 2014/0111110 | A1* | 4/2014 | Qi | H05B 45/38 315/210 |
| 2014/0168567 | A1* | 6/2014 | Kikuchi | H05B 45/14 349/61 |
| 2014/0232288 | A1 | 8/2014 | Brandes et al. | |
| 2014/0333859 | A1 | 11/2014 | Zhang et al. | |
| 2015/0327340 | A1* | 11/2015 | Siessegger | H05B 45/375 315/200 R |
| 2016/0081145 | A1* | 3/2016 | Peeters | A01G 9/20 315/185 R |
| 2016/0286615 | A1 | 9/2016 | Weeks, Jr. et al. | |
| 2017/0027032 | A1* | 1/2017 | Kong | G09G 3/32 |
| 2019/0045595 | A1 | 2/2019 | Johnsen et al. | |
| 2020/0404759 | A1* | 12/2020 | Zhang | H03K 17/687 |

FOREIGN PATENT DOCUMENTS

| | | | |
|---|---|---|---|
| CN | 103929851 | A | 7/2014 |
| JP | 2014-146595 | A | 8/2014 |
| JP | 2021-19078 | A | 2/2021 |
| JP | 2022-68129 | A | 5/2022 |
| JP | 2023-76217 | A | 6/2023 |
| TW | 201208464 | A | 2/2012 |

* cited by examiner

LIGHTING DEVICE

RELATED APPLICATIONS

This application claims priority to U.S. Provisional Application Ser. No. 63/384,234 filed Nov. 18, 2022, which is herein incorporated by reference in its entirety.

BACKGROUND

Field of Invention

The disclosure relates to a lighting device. More particularly, the disclosure relates to a lighting device configured with flickering functions.

Description of Related Art

Nowadays, lighting is highly relevant to human life. Good lighting can improve life quality for human beings. In certain cases, the stimulation of visible flicking light are desired to comply with some specific requirements. However, the human visual system may be easily fatigued and stressed under an environment illuminated by the visible flickering light. Furthermore, it may be affected on dizziness, eye pressure and/or decreases in visual acuity while working, learning or living under a flickering lighting environment for a long time. Therefore, how to provide a lighting device to solve the aforementioned issue is an important issue in this field.

SUMMARY

To solve the above mentioned issues, the present disclosure provides a lighting device. The lighting device includes a driving power source, a first light string, a second light string, a constant current controller and a pulse width modulation controller. The driving power source is configured to provide a DC driving current to a shunt node. The first light string is electrically coupled between the shunt node and a ground terminal, and the first light string is configured to be driven by a first pulsating direct current. The second light string is electrically coupled to the shunt node, and the second light string is configured to be driven by a second pulsating direct current. The second light string and the constant current controller electrically coupled between the shunt node and the ground terminal. The pulse width modulation controller is configured to provide a pulse signal to the constant current controller. The constant current controller is configured to control a pulse frequency of the second pulsating direct current provided to the second light string according to the pulse signal.

Summary, the lighting device of the present disclosure configured with the second light string for emitting flickering light by control a pulse frequency of the second pulsating direct current provided to the second light string, in order to comply with the certain requirement (such as, treatment, prevention or improvement for a specific disease or symptom). Furthermore, since the DC current is the constant current which is divided into the first pulsating direct current and the second pulsating direct current, the first pulsating direct current flowing through the first light string is 180 degrees out of phase in respect to the second pulsating direct current flowing through the second light string, such that the first light string driven by the first pulsating direct current can reduce the human visual perception for the flicker produced by the second light string.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference is now made in detail to the present embodiments of the disclosure, examples of which are illustrated in the accompanying drawings. The embodiments below are described in detail with the accompanying drawings, but the examples provided are not intended to limit the scope of the disclosure covered by the description. The structure and operation are not intended to limit the execution order. Furthermore, for simplifying the diagrams, some of the conventional structures and elements are shown with schematic illustrations. Any structure regrouped by elements, which has an equal effect, is covered by the scope of the present disclosure. The terms used in this specification and claims, unless otherwise stated, generally have their ordinary meanings in the art, within the context of the disclosure, and in the specific context where each term is used. In the following description and in the claims, the terms "include" and "comprise" are used in an open-ended fashion, and thus should be interpreted to mean "include, but not limited to." As used herein, the term "and/or" includes any and all combinations of one or more of the associated listed items.

Figure 1:
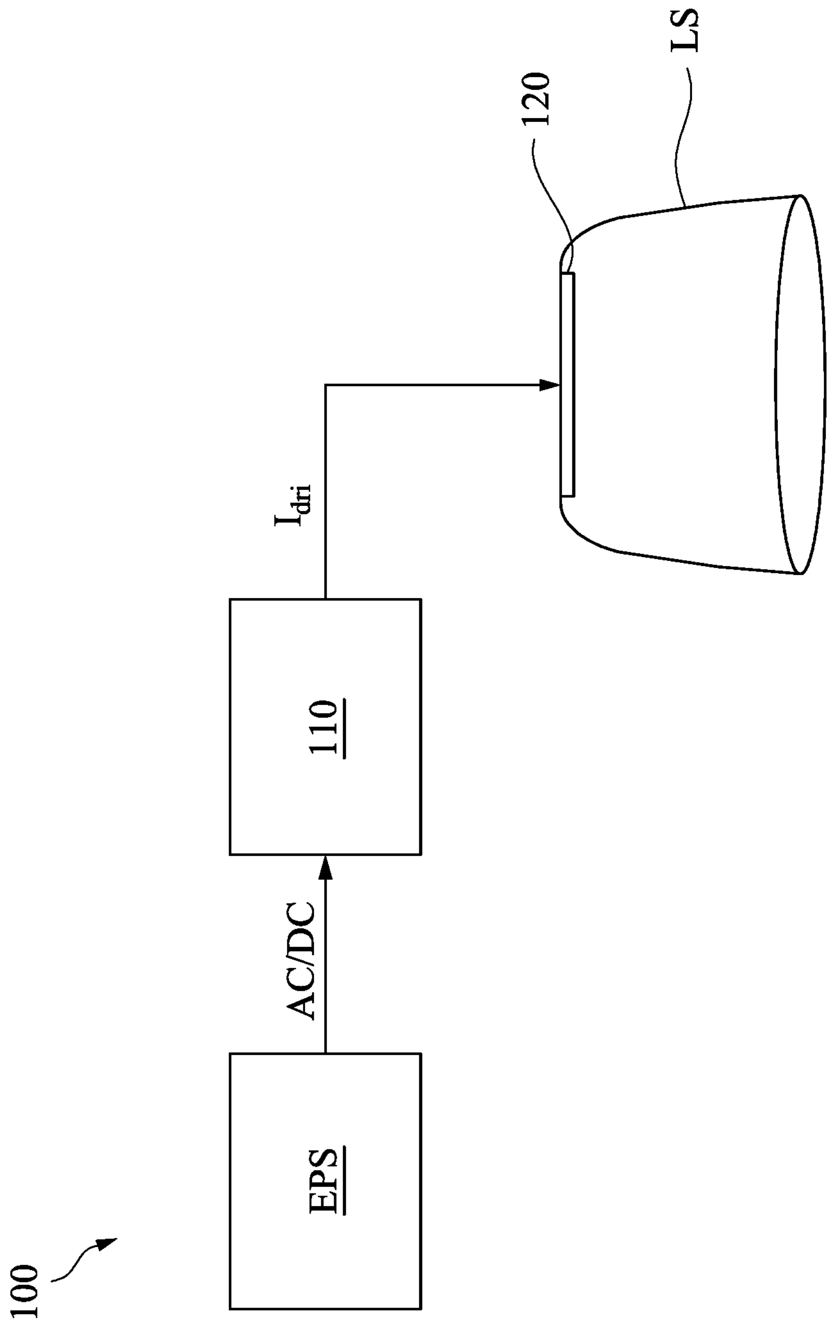
FIG. 1 is a schematic diagram illustrating a lighting device in accordance with some embodiments of the present disclosure.

Reference is made to FIG. 1. FIG. 1 is a schematic diagram illustrating a lighting device 100 in accordance with some embodiments of the present disclosure. As shown in FIG. 1, the lighting device 100 includes a driving power source 110, a lighting module 120 and a lampshade LS. In some embodiments, the lighting module 120 is a light emitting diode (LED) lighting module. In some embodiments, a lamp consists of the lighting module 120 and the lampshade LS, the lamp can be a recessed lamp, a table lamp, a standing lamp or other types of lamps. In some embodiments, the driving power source 110 is a LED driver. In some embodiments, the driving power source 110 can be considered as a voltage converter. In some embodiments, the driving power source 110 is electrically coupled to an electric power supply EPS, and the driving power source 110 is configured to convert an alternating current AC or a direct current DC supplied from the electric power supply EPS to a DC driving current $I_{dri}$ to drive the lighting module 120 to emit light. In some embodiments, the driving power source 110 has a constant current control function, which can adjust amplitude of the DC driving current $I_{dri}$ supplied to the lighting module 120. In some embodiments, the electric power supply EPS can be implemented by main power, battery or other power supply, which is not intended to limit the present disclosure.

Figure 2:
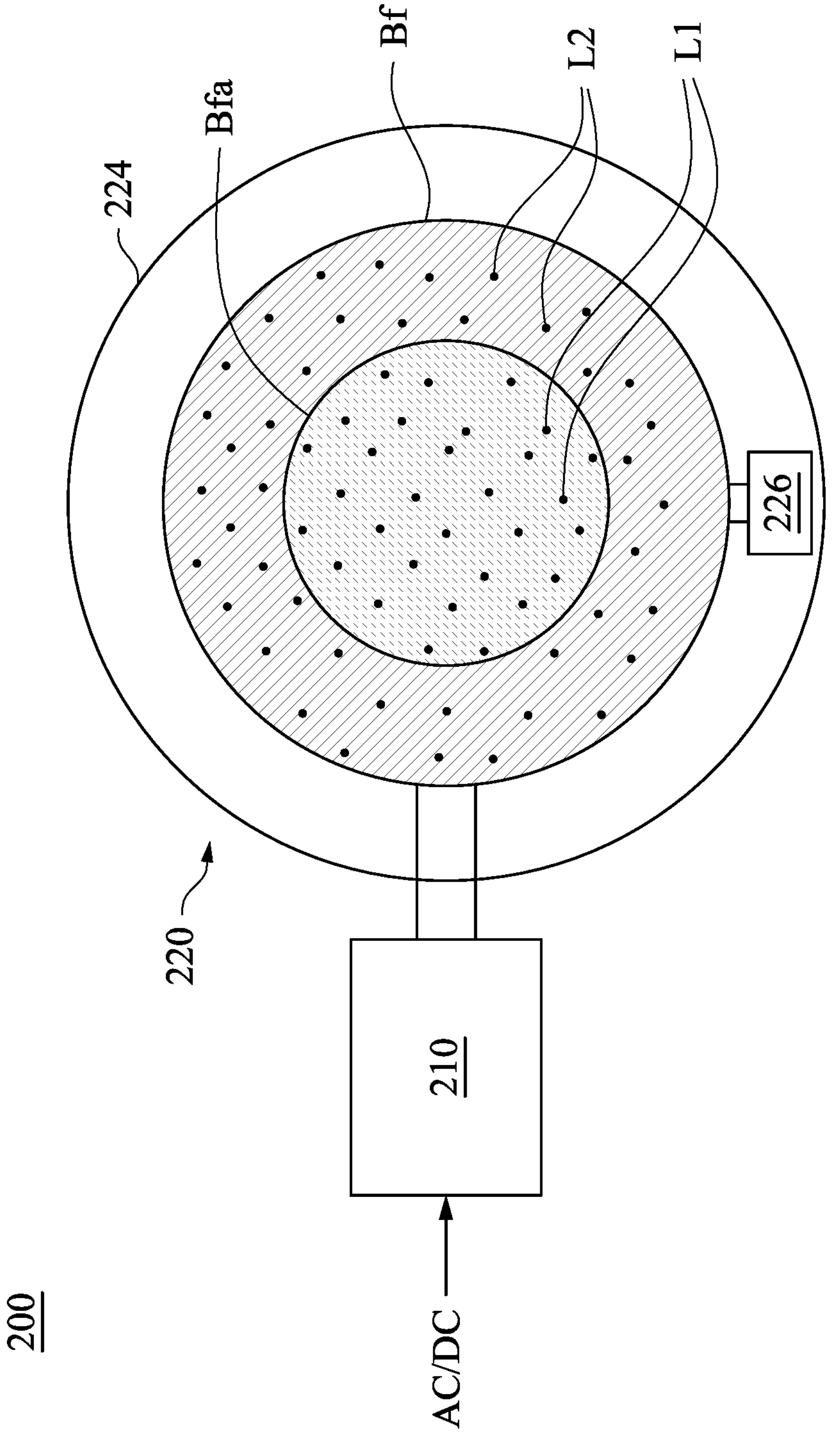
FIG. 2 is a schematic diagram illustrating a lighting device in accordance with some embodiments of the present disclosure.

Reference is made to FIG. 1 and FIG. 2. FIG. 2 is a schematic diagram illustrating a lighting device 200 in accordance with some embodiments of the present disclosure. As shown in FIG. 2, the lighting device 200 includes a driving power source 210, a light board 224, a light dimming circuit 226 and light emitting elements L1 and L2. In some embodiments, the light emitting elements L1 and L2 are light emitting diodes. In some embodiments, the light emitting elements L1 and L2 are light emitting diode chips. In some embodiments, the light board 224 can be implemented by a printed circuit board. In some embodiments, the light emitting elements L1 and L2 and the light dimming circuit 226 are mounted on the light board 224, the light emitting elements L1 and L2 are powered by the light board 224. As such, the aforesaid elements and/or components can be considered as a single device to operate. In some embodiments, the driving power source 210 and the lighting module 220 are respectively correspond to the driving power source 110 and the lighting module 120 of the embodiment in FIG. 1, and the description is omitted here.

In some embodiments, a segment of the light board 224 used to mount the light emitting element L2 is defined as a light emitting diode block Bf, and the luminance and the frequency of the flickering light emitted from the light emitting diode block Bf is controlled by the light dimming circuit 226. In some embodiments, the light dimming circuit 226 has constant current control and pulse width modulation functions for dimming control of flickering light, and the light dimming circuit 226 is configured to control the light emitting element L2 disposed in the light emitting diode block Bf to emit flickering light.

In some embodiments, the other segment of the light board 224 used to mount the light emitting element L1 is defined as a light emitting diode block Bfa, and the light emitting diode block Bfa is configured to emit flickering light which is 180 degrees out of phase in respect to the flickering light emitted from the light emitting diode block Bf.

In some embodiments, the light emitting elements L1 and L2 disposed in the light board 224 are white light emitting diodes. As such, the light emitting diode block Bf of the light board 224 emits whit flickering light, and the light emitting diode block Bfa emits whit flickering light which are 180 degrees out of phase of the whit flickering light emitted by the light emitting diode block Bf. In some embodiments, the color temperature of the white light emitting diode is between 2700K and 6500K. In other embodiments, the color temperature of the white light emitting diode can designed to be lower than 2700K or higher than 6500K based on certain requirements, which is not intended to limit the present disclosure.

In some embodiments, the light emitting elements L1 are white light emitting diodes, and the light emitting elements L2 are single-color light emitting diodes. In some embodiments, the light emitting elements L1 are single-color light emitting diodes, and the light emitting elements L2 are white light emitting diodes. As such, the light board 224 emits white flickering light blended with single-color flickering light, in which the white flickering light is 180 degrees out of phase in respect to the single-color flickering light. In some embodiments, the aforesaid single-color light emitting diode has a certain peak wavelength/spectral range, in order to provide the corresponding treatment for the user based on the certain spectral range of the single-color light emitting diode. For example, the aforesaid single-color light emitting diode can be implemented by red light diode with red light spectrum range, near infrared light diode with near infrared light spectrum range or far infrared light diode with far infrared light spectrum range, in order to prevent/improve retinal inflammation, vision deterioration or other symptoms. For the other example, the aforesaid single-color light emitting diode can be implemented by green light emitting diode with green light spectrum range, in order to prevent/improve diseases, such as, glaucoma. The types of aforementioned single-color light-emitting diodes are only exemplary examples; the present disclosure is not limited thereto.

Figure 3:
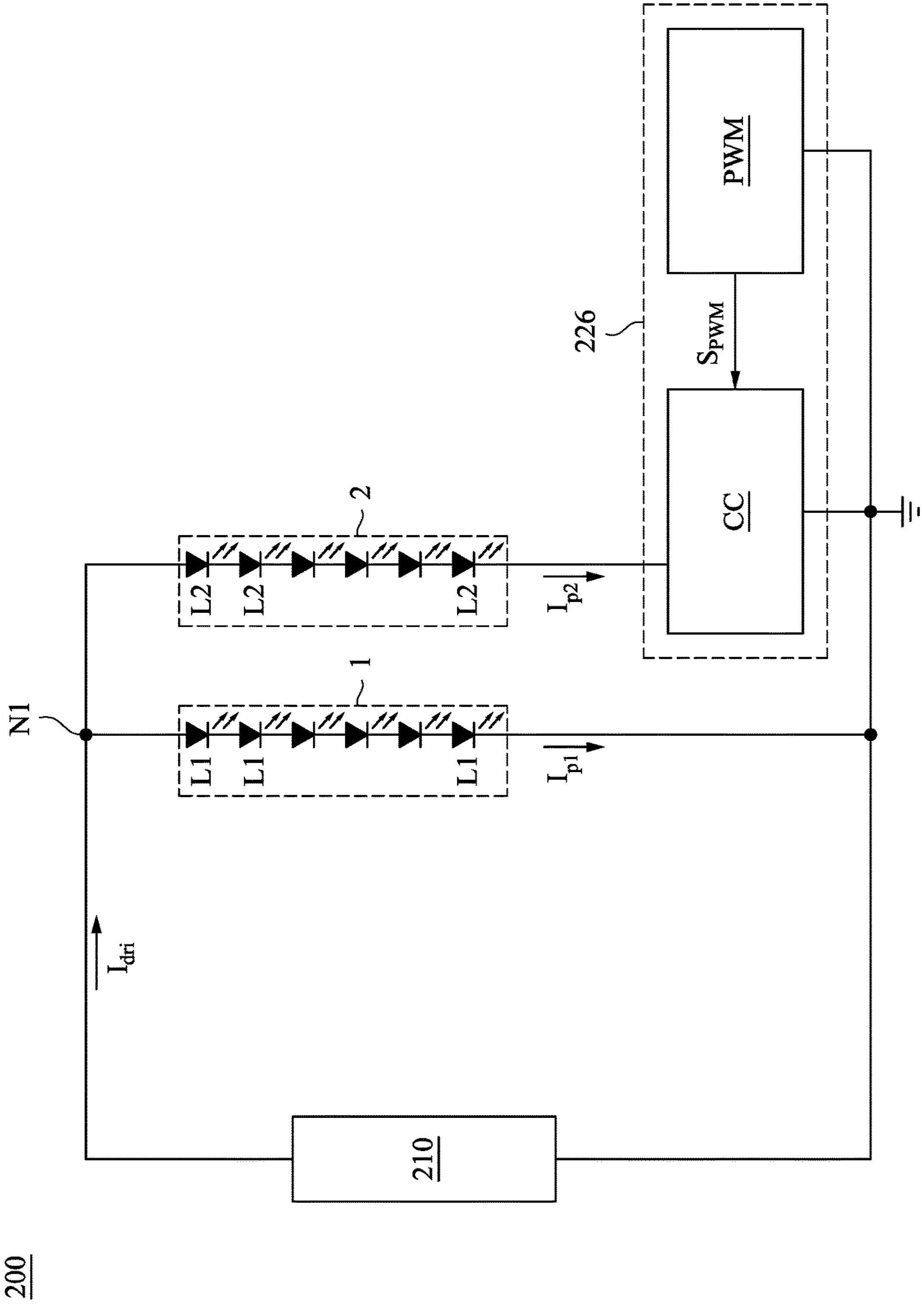
FIG. 3 is a schematic diagram illustrating function block of a lighting device in accordance with some embodiments of the present disclosure.

FIG. 3 is a schematic diagram illustrating function block of a lighting device 200 in accordance with some embodiments of the present disclosure. As shown in FIG. 3, a light string 1 consists of multiple light emitting elements L1 connected in series, and a light string 2 consists of multiple light emitting elements L2 connected in series.

In some embodiments, an anode of the light string 1 and an anode of the light string 2 are electrically coupled to the shunt node N1, and a cathode of the light string 1 is grounded. In some embodiments, the light dimming circuit 226 is electrically coupled between a cathode of the light string 2 and the ground terminal. That is, the light string 2 and the light dimming circuit 226 are electrically connected in series between the shunt node N1 and the ground terminal.

In some embodiments, an output terminal of the driving power source 210 is electrically coupled to the shunt node N1 to provide the DC driving current $I_{dri}$ to the shunt node N1. In some embodiments, the DC driving current $I_{dri}$ is divided at the shunt node N1 into the pulsating direct current $I_{p1}$ flowing through the light string 1 and the pulsating direct current $I_{p2}$ flowing through the light string 2. In some embodiments, the pulsating direct current $I_{p2}$ flowing through the light string 2 is controlled by the light dimming circuit 226, and the pulsating direct current $I_{p1}$ flowing through the light string 1 is generated according to a difference between the DC driving current $I_{dri}$ and the pulsating direct current $I_{p2}$.

In some embodiments, the light dimming circuit 226 includes a pulse width modulation controller PWM and a constant current controller CC. In some embodiments, the pulse width modulation controller PWM is configured to generate and provide low frequency pulse signal $S_{PWM}$ to the constant current controller CC. In some embodiments, the constant current controller CC has a constant current control function and/or pulse width modulation function, and the constant current controller CC is configured to control pulse frequency and amplitude of the pulsating direct current $I_{p2}$ flowing through the light string 2, in order to control the light string 2 to emit flickering light at low frequency according to the pulsating direct current $I_{p2}$.

In some embodiments, the aforesaid flickering light at low frequency emitted by the light string 2 is to prevent, improve and/or treat specific diseases (e.g. Alzheimer's disease) or symptoms (e.g. attention deficit, dysautonomia or other symptoms). In some embodiments, the low frequency of the flickering light emitted by the light string 2 for specific purpose is perceptible by human visual system, such as, a frequency lower than 80 Hz. As a result, the pulse frequencies of the pulse signal $S_{PWM}$ and the pulsating direct current $I_{p2}$ can be set at a frequency lower than 80 Hz. As such, the flickering light emitted by the light string 2 can prevent, improve and/or treat specific diseases (e.g. Alzheimer's disease) or symptoms (e.g. attention deficit, autonomic dysautonomia or other symptoms).

In another embodiment, light stimulation at 40 Hz can prevent, improve and/or treat certain degenerative neurological diseases, such as Alzheimer's disease. Therefore, the pulse frequencies of the pulse signal $S_{PWM}$ and the pulsating direct current $I_{p2}$ can be set at 40 Hz. As such, the light stimulation provided by the light string 2 can prevent, improve and/or treat Alzheimer's disease.

In some other embodiments, the setting of flicker frequency of the flickering light emitted by the light string 2 can be set according to human brainwaves (for example, a waves (such as, 8 Hz~14 Hz), ß waves (such as, 12.5 Hz~28 Hz), y waves (such as, 25 Hz~100 Hz), in order to synchronize light stimulation with the activity rhythm of human brain cells, thereby improving human concentration, stabilizing mood, reducing pressure and/or increasing consciousness, etc. As a result, the low frequency of flickering light emitted by the light string 2, the pulse frequencies of the pulse signal $S_{PWM}$ and/or the pulsating direct current $I_{p2}$ can be set at the other desired frequency, which is not intended to limit the present disclosure.

To be noted that, the light string 1 refers to the connection relationship of the light emitting elements L1 electrically connected in series, instead of the arrangement of the light emitting elements L1 on the light board 224, and the light string 2 refers to the connection relationship of the light emitting elements L2 electrically connected in series, instead of the arrangement of the light emitting elements L2 on the light board 224. In some embodiments, there are various configurations to arrange the light emitting element L1 of the light string 1 and the light emitting element L2 of the light string 2 in the light board 224. In some embodiments, the light board 224 can be configured with one or more light strings 1 and one or more light strings 2. In some embodiments, the light board 224 is configured with multiple light strings 1 and a light string 2 connected in parallel between the shunt node N1 and the ground terminal. In some embodiments, the light board 224 is configured with a light strings 1 and multiple light strings 2 connected in parallel between the shunt node N1 and the constant current controller CC. The number of the light string 1 and the number of the light string 2 configured in the light board 224 are only exemplary examples; the present disclosure is not limited thereto.

Reference is made to FIG. 2 again, the light emitting elements L1 and the light emitting elements L2 are arranged in order along a direction from the center of the light board 224 to an outer edge of the light board 224. In the embodiments of FIG. 2, the light emitting diode block Bfa used to mount the light emitting elements L1 is a center segment of the light board 224, and the light emitting diode block Bf used to mount the light emitting elements L2 is outer segment of the light board 224. In other words, the light emitting elements L1 are disposed in the center area of the light board 224, and the light emitting elements L2 are disposed in the outer area of the light board 224. In this case, the light emitting elements L2 surround around the light emitting elements L1.

In some embodiments, the light emitting elements L2 and the light emitting elements L1 are arranged in order along a direction from the center of a light board to an outer edge of the light board. In other words, the light emitting elements L2 are disposed in a center area of the light board, and the light emitting elements L1 are disposed in an outer area of the light board 224. As such, the light emitting elements L2 are surrounded by the light emitting elements L1. In some embodiments, the number of the light emitting element L1 in the light board is more than the number of the light emitting element L2 in the light board (such as, the number of the light string 1 more than the number of the light string 2), and a difference between a maximum amplitude $A_{max1}$ and minimum amplitude $A_{min1}$ of the pulsating direct current $I_{p1}$ is decreased, such that the variation of radiation output of the light-emitting element L1 is a smaller than the variation of radiation output of the light-emitting element L2. As such, a ratio of the overall radiation output of the light emitting elements L1 to the overall radiation output of the light emitting elements L2 is increased, so as to reduce the human visual perception for the flicker. As such, the arrangement of the light emitting elements L1 surrounding around the light emitting elements L2 can let the flickering light emitted by the light emitting elements L1 which are restively hard to be perceived by human visual system surrounds around the flickering light emitted by the light emitting elements L2, so as to reduce the human visual perception for the flicker included in the radiation output of the light board, and the lighting device 100 can be used as a general illumination device. As such, the lighting device 100 can be used as a general illumination device capable for improve concentration or prevent certain diseases.

In some embodiments, the light emitting elements L1 and L2 are arranged staggered on the light board. In some embodiments, the light emitting elements L1 and L2 are arranged staggered on the light board in a checkerboard pattern.

In some embodiments, the light emitting elements L1 and L2 are arranged staggered on the light board in a line interlaced pattern.

In some embodiments, the light emitting elements L1 and L2 are arranged staggered on the light board in a honeycomb pattern. To be noted that, the arrangements of the light emitting elements L1 and L2 on the light board are only exemplary examples; the present disclosure is not limited thereto.

Figure 4A:
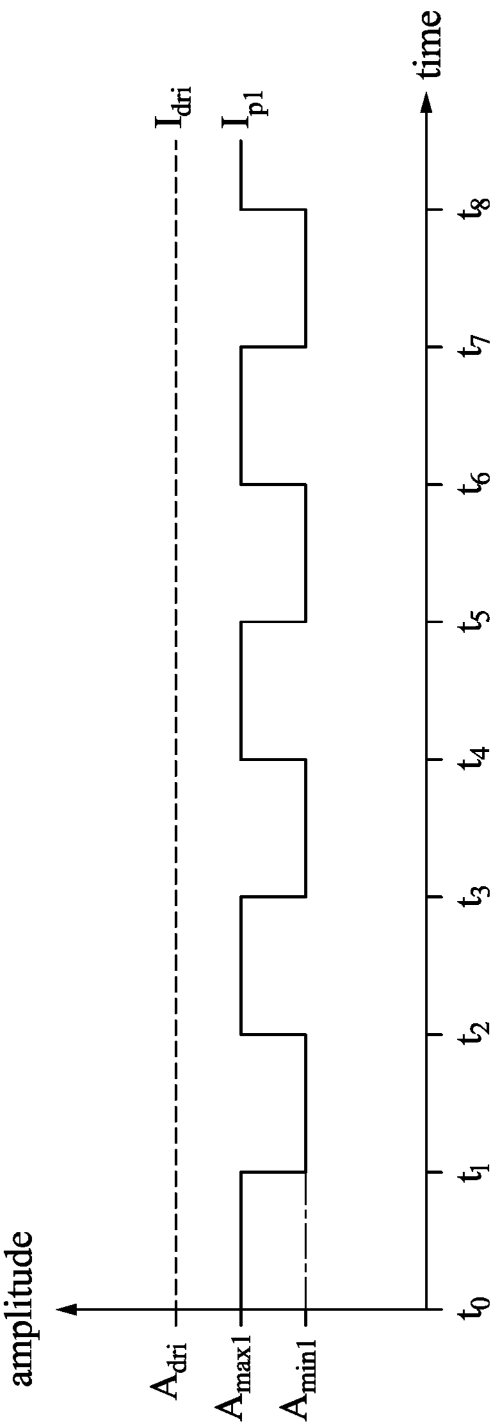
FIG. 4A and FIG. 4B are schematic diagrams illustrating DC driving current and pulsating direct current in accordance with some embodiments of the present disclosure.
Figure 4B:
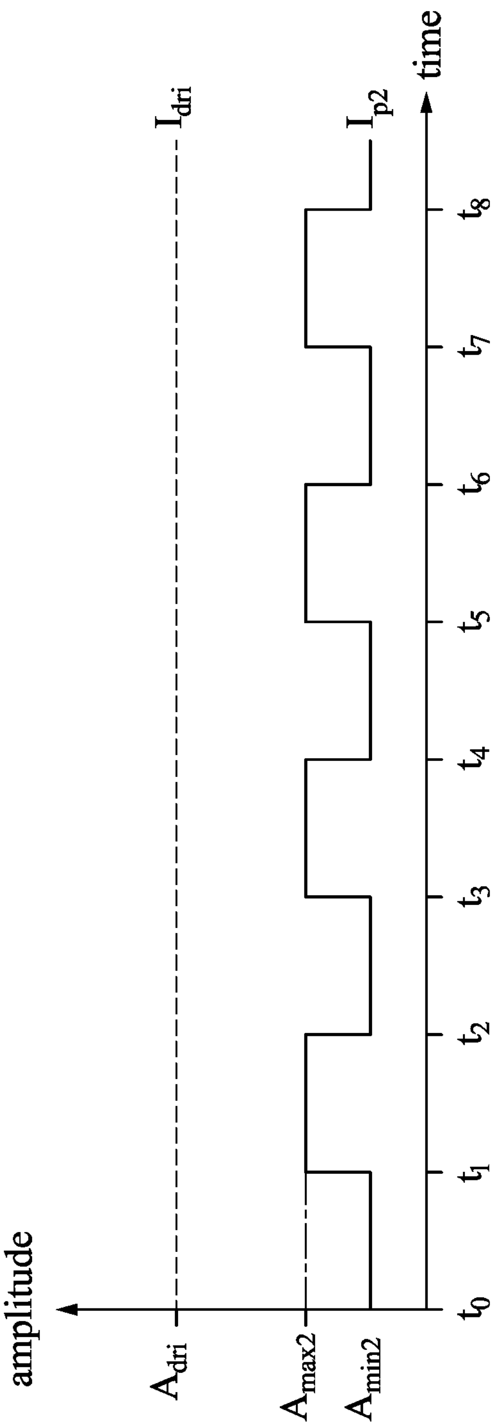

Reference is made to FIG. 3, FIG. 4A and FIG. 4B. FIG. 4A and FIG. 4B are schematic diagrams illustrating DC driving current $I_{dri}$ and pulsating direct currents $I_{p1}$ and $I_{p2}$ in accordance with some embodiments of the present disclosure. As shown in FIG. 4A and FIG. 4B, the DC driving current $I_{dri}$ output by the driving power source 210 is a constant current. The pulsating direct current $I_{p1}$ flowing through the light string 1 and the pulsating direct current $I_{p2}$ flowing through the light string 2 are periodically changed with time $t_0$~$t_8$.

In some embodiments, the constant current controller CC controls the pulse frequency of the pulsating direct current $I_{p2}$ according to the pulse signal $S_{PWM}$, in which the pulsating direct current $I_{p2}$ is in phase in respect to the pulse signal $S_{PWM}$. In some embodiments, on a basis of Kirchhoff's circuit laws, a sum of the pulsating direct current $I_{p1}$ flowing through the light string 1 and the pulsating direct current $I_{p2}$ flowing the light string 2 is substantially equal to the DC driving current $I_{dri}$, in which the DC driving current $I_{dri}$ is a constant current resulted in the pulsating direct current $I_{p2}$ is 180 degrees out of phase in respect to the pulsating direct current $I_{p1}$. In some embodiments, since the pulsating direct current $I_{p2}$ is 180 degrees out of phase in respect to the pulsating direct current $I_{p1}$, the light string 1 driven by the pulsating direct current $I_{p1}$ can compensates the luminance of the light string 2, such that the overall radiation output of the lighting module 220 is not 0 at every time points, in order to provide low frequency flicker stimulation and reduce the human visual perception for the flicker produced by the light string 2 at the same time. As such, the pressure on the human visual system caused from flicker stimulation can be reduced.

In some embodiments, the constant current controller CC can control and/or adjust the maximum amplitude $A_{max2}$ and the minimum amplitude $A_{min2}$ Of the pulsating direct current $I_{p2}$, to adjust the strength of the flickering light stimulation generated from the light string 2. In some embodiments, the maximum amplitude $A_{max2}$ and the minimum amplitude $A_{min2}$ of the pulsating direct current $I_{p2}$ are set in a range of 0~1 times of the amplitude $A_{dri}$ of the DC driving current $I_{dri}$. In some embodiments, the maximum amplitude $A_{max2}$ of the pulsating direct current $I_{p2}$ can be set at a value which is larger than 0 and smaller than the amplitude $A_{dri}$ of the DC driving current $I_{dri}$. In some embodiments, the minimum amplitude $A_{min2}$ of the pulsating direct current $I_{p2}$ can be 0. In other embodiments, the minimum amplitude $A_{min2}$ is greater than 0 and is less than the value of the maximum amplitude $A_{max2}$.

In some embodiments, the maximum amplitude $A_{max1}$ of the pulsating direct current $I_{p1}$ is a difference between the amplitude $A_{dri}$ of the DC driving current $I_{dri}$ and the minimum amplitude $A_{min2}$ of the pulsating direct current $I_{p2}$. In some embodiments, the minimum amplitude $A_{min1}$ of the pulsating direct current $I_{p1}$ is a difference between the amplitude $A_{dri}$ of the DC driving current $I_{dri}$ and the maximum amplitude $A_{max2}$ of the pulsating direct current $I_{p2}$.

In some embodiments, the cycle of the pulsating direct current $I_{p1}$ corresponds to the cycle of the pulsating direct current $I_{p2}$. That is, the pulse frequency of the pulsating direct current $I_{p1}$ corresponds to the pulse frequency of the pulsating direct current $I_{p2}$.

In some embodiments, the duty cycle of the pulsating direct current $I_{p2}$ (which means a ratio of the pulse duration (such as, time $t_1$~$t_2$) to the total period (such as, time $t_0$~$t_2$) does not change with time. In other words, the duty cycle of pulsating direct current $I_{p2}$ is set at a constant value. Correspondingly, the duty cycle of pulsating direct current $I_{p1}$ is at the constant value.

Figure 5:
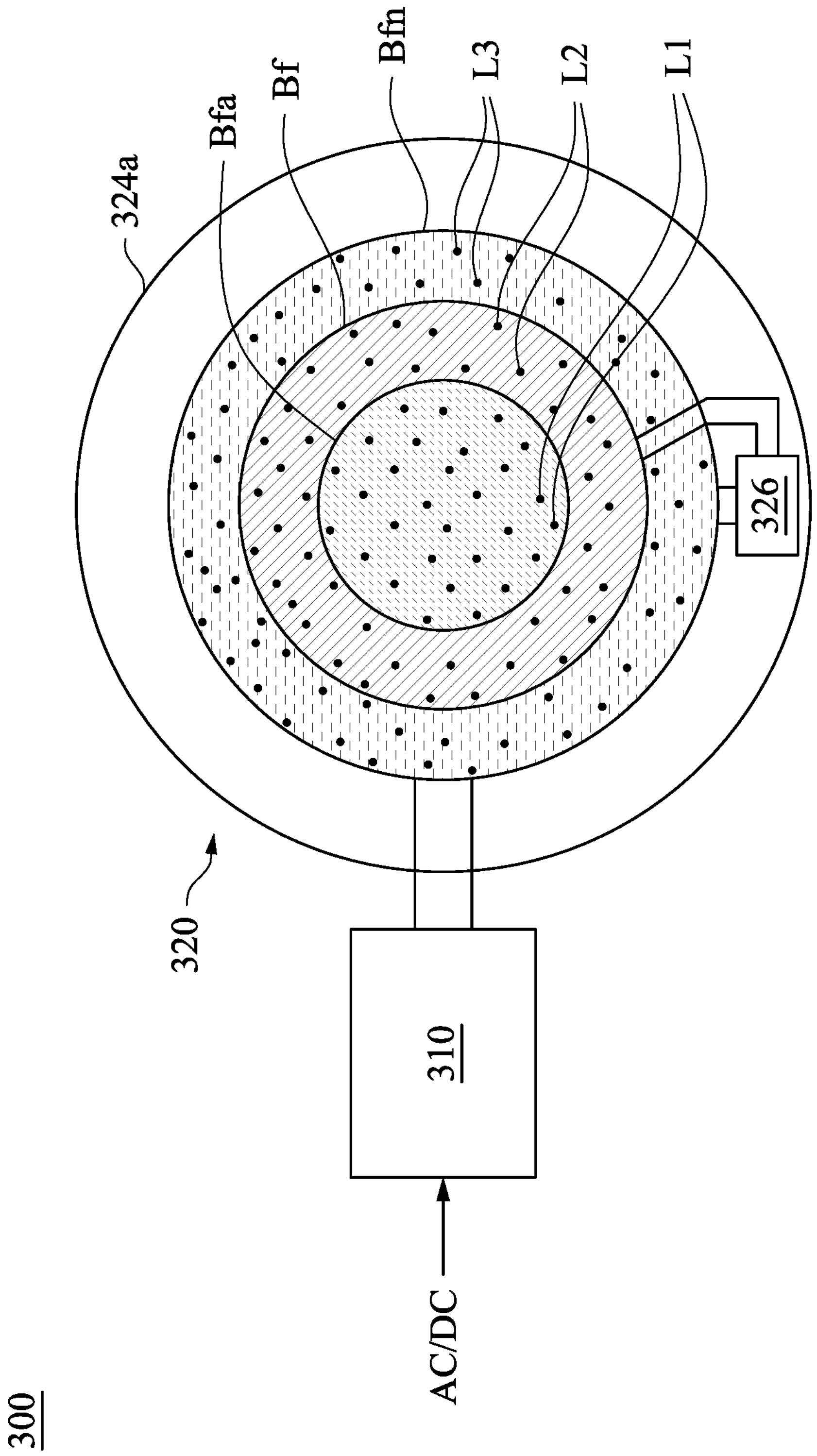
FIG. 5 is a schematic diagram illustrating a lighting device in accordance with some embodiments of the present disclosure.

Reference is made to FIG. 5. FIG. 5 is a schematic diagram illustrating a lighting device 300 in accordance with some embodiments of the present disclosure. The lighting device 300 includes a driving power source 310, a light board 324, a light dimming circuit 326 and light emitting elements L1, L2 and L3. In some embodiments, the light emitting elements L1, L2 and L3 are light emitting diodes. In some embodiments, the light emitting elements L1, L2 and L3 are light emitting diode chips. In some embodiments, the light board 324 can be implemented by the printed circuit board. In some embodiments, the light emitting elements L1, L2 and L3 and the light dimming circuit 326 are mounted on the light board 324, the light emitting elements L1, L2 and L3 can be powered by the light board 324. As such, the aforesaid elements and/or components can be considered as a single device to operate. In some embodiments, the driving power source 310 and the lighting module 320 are respectively correspond to the driving power source 210 and the lighting module 220 of the embodiment of FIG. 2, and the description is omitted here.

In some embodiments, the total number of the light emitting elements L1 and L2 is less than or equal to the total number of the light emitting elements L3.

In some embodiments, the radiation output or power output of the light emitting elements L1 and L2 of the lighting device 300 is less than or equal to the radiation output or power output of the light emitting elements L3 of the lighting device 300

In some embodiments, a segment of the light board 224 used to mount the light emitting elements L2 is defined as the light emitting diode block Bf, and the luminance and frequency of the flickering light emitted from the light emitting diode block Bf are controlled by the light dimming circuit 326. In some embodiments, the light dimming circuit 326 has constant current control and pulse width modulation functions for dimming flickering light, and the light dimming circuit 326 is configured to control the light emitting element L2 in the light emitting diode block Bf to emit the flickering light.

In some embodiments, another segment of the light board 324 used to mount the light emitting elements L1 is defined as the light emitting diode block Bfa, and the light emitting diode block Bfa is configured to emit flickering light which are 180 degrees out of phase in respect with the flickering light emitted by the light emitting diode block Bf.

In some embodiments, the other segment of the light board 324 used to mount the light emitting elements L3 is defined as the light emitting diode block Bfn, and the light emitting diode block Bfn is configured to emit the light without visible flickering. As such, the overall radiation output of the lighting device 300 can be maintained at a certain value, thereby improving the pressure on human visual system caused by the light emitted by the light emitting element L2 flickering between bright and dark states.

In some embodiments, for the light device 300, a ratio of the radiation output of the light emitting diode block Bfn for emitting visible flickering light and the radiation output of the light emitting diode block Bf for emitting light without visible flickering can be set in a range between 1 to 1 and 1 to 100.

In some embodiments, all of the light emitting elements L1, L2 and L3 disposed in the light board 324 are white light emitting diodes, and the light board 324 emits white light without flickering blended with white flickering light. In some embodiments, the color temperature of the white light emitting diode is between 2700K and 6500K. In other embodiments, the color temperature of the white light emitting diode can be lower than 2700K or higher than 6500K based on designed requirements, which is not intended to limit the present disclosure.

In some embodiments, the light emitting elements L1, L2 and L3 disposed in the light board 324 includes at least one white light emitting diode and at least one single-color light emitting diode, in which the single-color light emitting diode has a certain peak wavelength/spectral range, in order to provide the corresponding treatment for the user based on the certain spectral range of the single-color light emitting diode. For example, the aforesaid single-color light emitting diode can be implemented by red light diode with red light spectrum range, near infrared light diode with near infrared light spectrum range or far infrared light diode with far infrared light spectrum range, in order to prevent/improve retinal inflammation, vision deterioration or other symptoms. For the other example, the aforesaid single-color light emitting diode can be implemented by green light emitting diode with green light spectrum range, in order to prevent/ improve diseases, such as, glaucoma. The types of aforementioned single-color light-emitting diodes are only exemplary examples; the present disclosure is not limited thereto.

In some embodiments, the light emitting elements L3 disposing in the light board 324 are white light emitting diodes, and the light emitting elements L1 or light emitting elements L2 are single-color light emitting diodes, such as the light board 324 emits white light without flickering blended with single-color flickering light. In some embodiments, the light emitting elements L1 and L3 are white light emitting diodes, and the light emitting elements L2 are single-color light emitting diodes. In some embodiments, the light emitting elements L2 and L3 are white light emitting diodes, and the light emitting elements L1 are single-color light emitting diodes. In these case, the overall radiation output of the white light emitting diodes is greater than the overall radiation output of the single-color light emitting diodes, such as the light board 324 emits the brighter white light blended with the darker single-color flickering light. In some embodiments, the light emitting element L3 disposing in the light board 324 are white light emitting diodes, and all of the light emitting elements L1 and L2 disposing in the light board 324 are single-color light emitting diodes, such as the light board 324 emits white light without flickering blended with single-color light flickering in different phases. In some embodiments, the light emitting elements L3 disposing in the light board 324 are single-color light emitting diodes, and the light emitting elements L1 or the light emitting elements L2 are white light emitting diodes, such as the light board 324 emit the single-color light blended with flickering white light. Descriptions above are only exemplary examples; the present disclosure is not limited thereto.

Figure 6A:
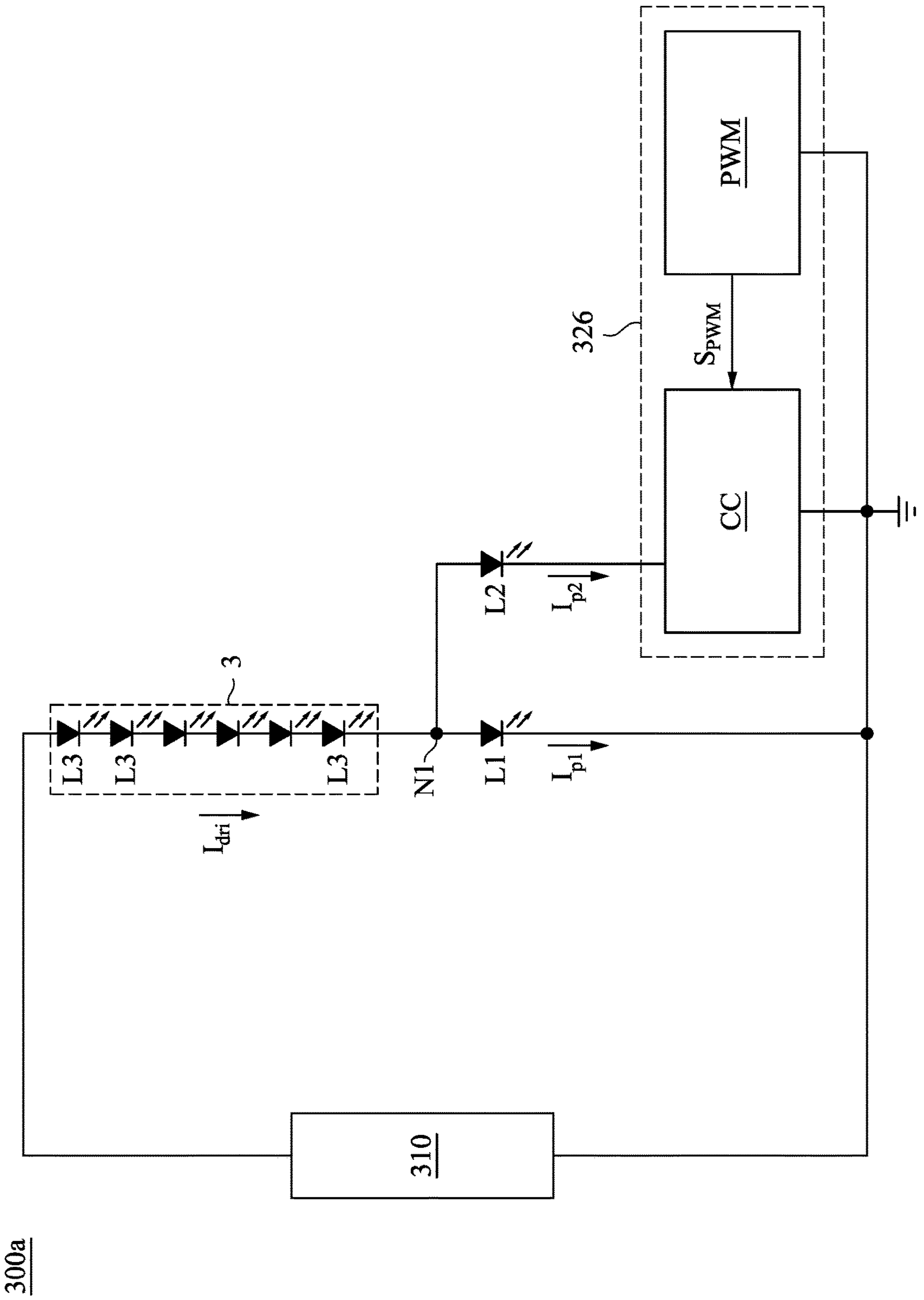
FIG. 6A and FIG. 6B are schematic diagrams illustrating function block of lighting devices in accordance with some embodiments of the present disclosure.

Reference is made to FIG. 5 and FIG. 6A. FIG. 6A is schematic diagrams illustrating function block of lighting device 300*a* in accordance with some embodiments of the present disclosure. As shown In FIG. 6A, the lighting device 300*a* includes a driving power source 310, a light string 3, a light emitting element L1, a light emitting element L2 and the light dimming circuit 326, in which the light string 3 consists of light emitting elements L3 connected in series. In some embodiments, the driving power source 310, the light emitting elements L1, L2 and L3 and the light dimming circuit 326 in FIG. 6A respectively correspond to the driving power source 310, the light emitting elements L1, L2 and L3 and the light dimming circuit 326 in FIG. 5.

In some embodiments, an anode of light string 3 is electrically coupled to an output terminal of the driving power source 310, and a cathode of the light string 3 is electrically coupled to the shunt node N1, so as to emit light without visible flickering.

In some embodiments, an anode of the light emitting element L1 is electrically coupled to the shunt node N1, and a cathode of the light emitting element L1 is grounded. In some embodiments, an anode of the light emitting element L2 is electrically coupled to the shunt node N1, and the cathode of the light emitting element L2 is electrically coupled to the light dimming circuit 326. The light emitting elements L1, L2 and L3 and the light dimming circuit 326 of the lighting device 300*a* are respectively correspond to the light emitting elements L1, L2 and L3 and the light dimming circuit 226 of the lighting device 200 in FIG. 3, the description is omitted here. And, the DC driving current $I_{dri}$ flowing through the light string 3, the pulsating direct current $I_{p1}$ flowing through the light emitting element L1 and the pulsating direct current $I_{p2}$ flowing through the light emitting element L2 are respectively correspond to the DC driving current $I_{dri}$, the pulsating direct current $I_{p1}$, and the pulsating direct current $I_{p2}$ in FIG. 4A and FIG. 4B, the description is omitted here.

Figure 6B:
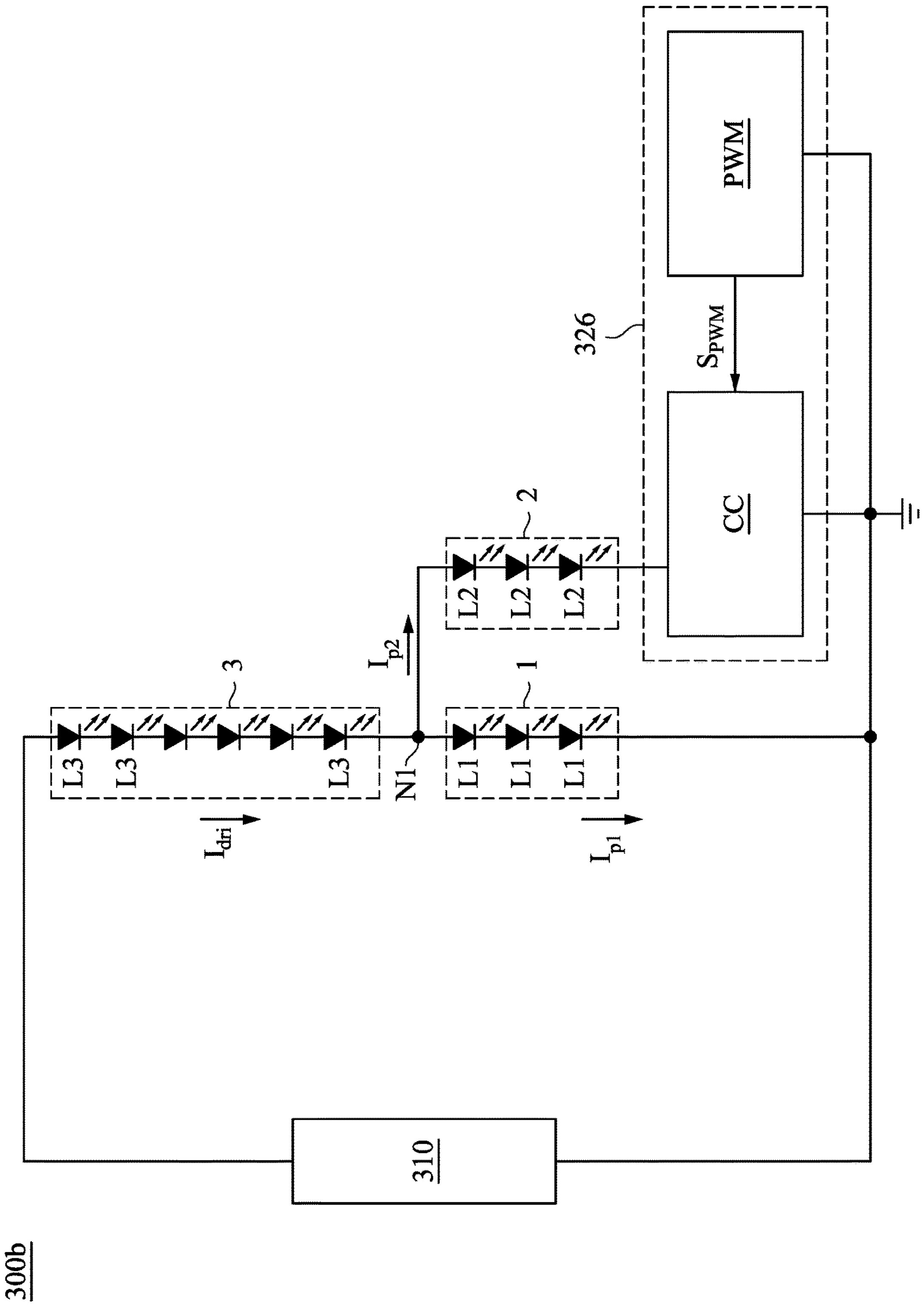

Reference is made to FIG. 6B. FIG. 6B is a schematic diagram illustrating function block of a lighting device 300*b* in accordance with some embodiments of the present disclosure. As shown in FIG. 6B, the lighting device 300*b* includes a driving power source 310, a light string 1 consisting of light emitting elements L1 connected in series, a light string 2 consisting of light emitting elements L2 connected in series, a light string 3 consisting of light emitting elements L3 connected in series and a light dimming circuit 326. In some embodiments, the driving power source 310, the light emitting elements L1, L2 and L2 and the light dimming circuit 326 in the embodiment of FIG. 6B are respectively correspond to the driving power source 310, the light emitting elements L1, L2 and L3 and the light dimming circuit 326 in the embodiment of FIG. 5.

Compare to the lighting device 300*a* in the embodiment of FIG. 6A, the difference of the lighting device 300*b* in the embodiment of FIG. 6B is that, the number of the light emitting elements L1 and the number of the light emitting elements L2. Specifically, the lighting device 300*b* in the embodiment of FIG. 6B includes the light string 1 and the light string 2, in which the light string 1 consists of multiple light emitting elements L1 connected in series between the shunt node N1 and the ground terminal, and the light string 2 consists of multiple light emitting elements L2 connected in series between the shunt node N1 and the light dimming circuit 326. Therefore, the number of the light emitting elements L1, it is not intended to limit the number of the light emitting elements L2 and the number of the light emitting elements L3 of the lighting device 300*a* and 300*b* of the present disclosure. The connection relationship and operation manner of the lighting device 300*b* is similar to the lighting device 300*a* in the embodiments of FIG. 6A, the description is omitted here.

Figure 7:
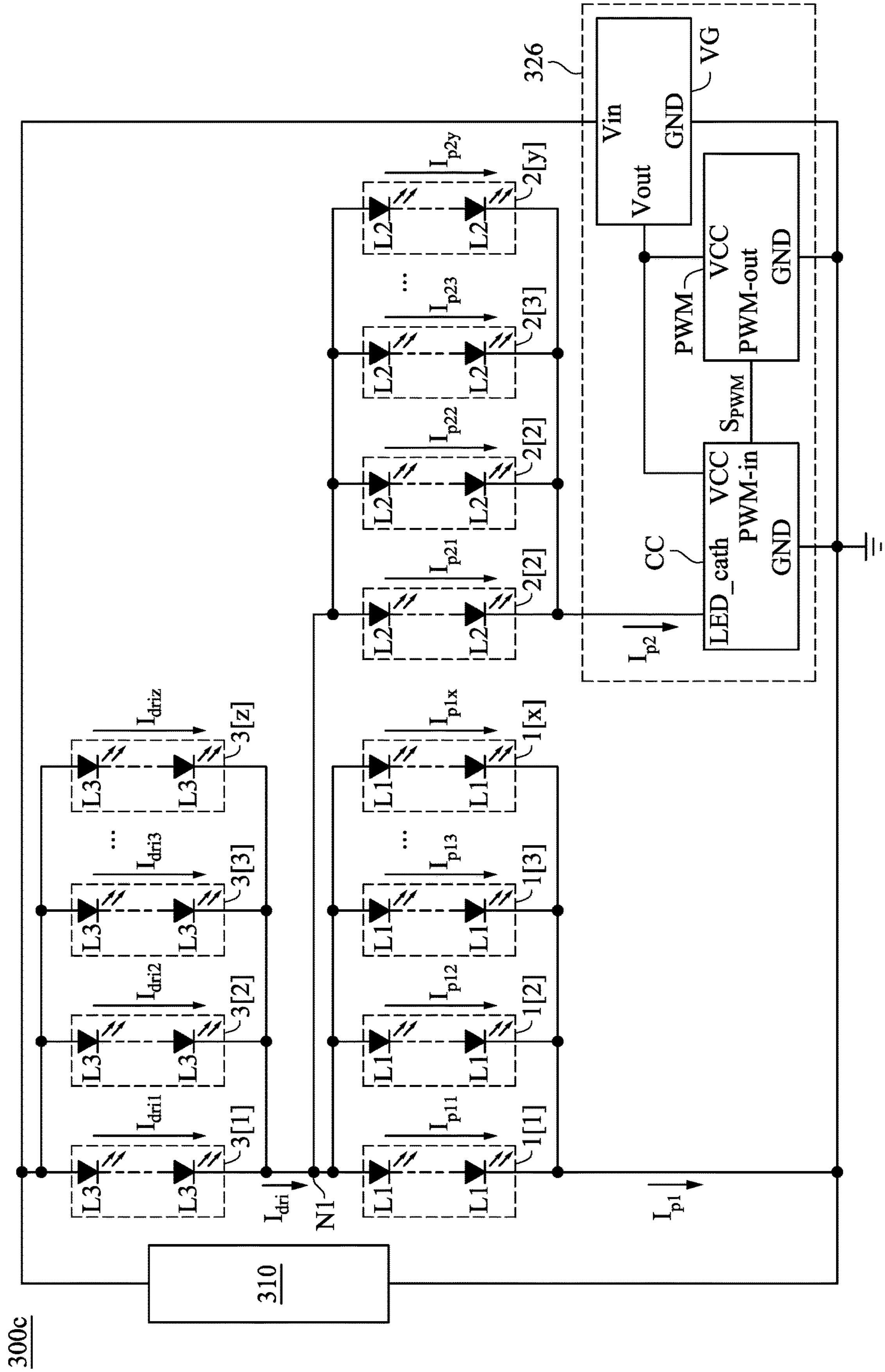
FIG. 7 is a schematic diagram illustrating function block of a lighting device in accordance with some embodiments of the present disclosure.

Reference is made to FIG. 7. FIG. 7 is a schematic diagram illustrating function block of a lighting device 300*c* in accordance with some embodiments of the present disclosure. As shown in FIG. 7, the lighting device 300*c* includes a driving power source 310, light strings 1[1]~1[*x*], 2[1]~2[*y*] and 3[1]~3[*z*] and light dimming circuit 326. In some embodiments, the driving power source 310, the light emitting elements L1, L2 and L3 and the light dimming circuit 326 in the embodiments of FIG. 7 respectively correspond to the driving power source 310, the light emitting elements L1, L2 and L3 and the light dimming circuit 326 in the embodiments of FIG. 5, the description is omitted here.

In some embodiments, anodes of the light strings 3[1]~3[*z*] are electrically coupled to an output terminal of to the driving power source 310, and cathodes of the light strings 3[1]~3[*z*] are electrically coupled to the shunt node N1. The light strings 3[1]~3[*z*] are driven by the DC driving current $I_{dri1}$~$I_{driz}$. In some embodiments, a sum of the DC driving current $I_{dri1}$~$I_{driz}$ is the DC driving current $I_{dri}$.

In some embodiments, anodes of the light strings 2[1]~2[*y*] are electrically coupled to the shunt node N1, and cathodes of the light strings 2[1]~2[*y*] are electrically coupled to the light dimming circuit 326. The pulsating direct currents $I_{p21}$~$I_{p2y}$ flowing through the light strings 2[1]~2[*y*] are controlled by light dimming circuit 326. In some embodiments, the light dimming circuit 326 includes a voltage generator VG, a pulse width modulation controller PWM and a constant current controller CC.

In some embodiments, the voltage generator VG includes pins Vin, Vout and GND. In some embodiments, the pin GND of the voltage generator VG is grounded. In some embodiments, the pin Vin of the voltage generator VG is electrically coupled to the output terminal of the driving power source 310, so as to convert a segment output of the driving power source 310 to an operation voltage, and output the operation voltage from the pin Vout.

In some embodiments, the pulse width modulation controller PWM includes pins VCC, PWM-out and GND. In some embodiments, the pin GND of the pulse width modulation controller PWM is grounded. In some embodiments, the pulse width modulation controller PWM receives the operation voltage generated by the voltage generator from the pin VCC. In some embodiments, the pulse width modulation controller PWM is configured to generate a pulse signal $S_{PWM}$, and to output the pulse signal $S_{PWM}$ from the pin PWM-out.

In some embodiments, the constant current controller CC includes pins LED_cath, PWM-in and GND. In some embodiments, the pin GND of the constant current controller CC is grounded. In some embodiments, the pin PWM-in of the constant current controller CC is configured to receive the pulse signal $S_{PWM}$ generated by the pulse width modulation controller PWM. In some embodiments, the pin LED_cath of the constant current controller CC is electrically coupled to the cathodes of the light strings 2[1]~2[*y*], and the constant current controller CC controls the pulse frequency and amplitude of the pulsating direct currents $I_{p21}$~$I_{p2y}$ flowing through the light strings 2[1]~2[*y*] according to the pulse signal $S_{PWM}$. In other words, the pulse frequencies and amplitudes of the pulsating direct currents $I_{p21}$~ $I_{p2y}$ flowing through the light strings 2[1]~2[*y*] can be controlled by the constant current controller CC, such as the light strings 2[1]~2[*y*] emit visible flickering light according to the pulsating direct currents $I_{p21}$~$I_{p2y}$, respectively. In some embodiments, a sum of the pulsating direct current $I_{p21}$~$I_{p2y}$ is the pulsating direct current $I_{p2}$.

In some embodiments, the DC driving current $I_{dri}$ is divided into the pulsating direct currents $I_{p1}$ and $I_{p2}$ at the shunt node N1. Based on the Kirchhoff's Laws, the pulsating direct currents $I_{p1}$ is determined according to the pulsating direct currents $I_{p1}$ and the DC driving current $I_{dri}$. In some embodiments, a difference between the pulsating direct currents $I_{p1}$ and the DC driving current $I_{dri}$ is amplitude of the pulsating direct currents $I_{p1}$. In some embodiments, the anodes of the strings 1[1]~1[*x*] are electrically coupled to the shunt node N1, and the cathodes of the strings 1[1]~1[*x*] are grounded. The strings 1[1]~1[*x*] are driven by the pulsating direct currents $I_{p11}$~$I_{p1x}$, respectively. In some embodiments, a sum of the pulsating direct currents $I_{p11}$~$I_{p1x}$ is the pulsating direct currents $I_{p1}$.

In some embodiments, anodes of the light strings 3[1]~3[*x*] are electrically coupled to the output terminal of the driving power source 310, and cathodes of the light strings 3[1]~3[*x*] are electrically coupled to the shunt node N1. The light strings 3[1]~3[*x*] are respectively driven by the DC driving current $I_{dri1}$~$I_{driz}$. In some embodiments, a sum of the DC driving current $I_{dri1}$~$I_{driz}$ is the DC driving current $I_{dri}$.

In some embodiments, by controlling the amplitude of the DC driving current $I_{dri}$ by the driving power source 310 and controlling the pulsating direct current $I_{p2}$ by the constant current controller CC, a ration of the radiation output of the light strings 3[1]~3[*x*] and the radiation output of the light strings 2[1]~2[*y*] can be set in a range between 1 to 1 and 100 to 1.

To be noted that, each of the light strings 1[1]~1[*x*] refers to the connection relationship of the light emitting elements L1 electrically connected in series, instead of the arrangement of the light emitting elements L1 on the light board 324*a*. Each of the light strings 2[1]~2[*y*] refers to the connection relationship of the light emitting elements L2 electrically connected in series, instead of the arrangement of the light emitting elements L2 on the light board 324*a*. Each of the light strings 3[1]~3[*z*] refers to the connection relationship of the light emitting elements L3 electrically connected in series, instead of the arrangement of the light emitting elements L3 on the light board 324*a*. In some embodiments, there are various configurations to arrange the light emitting element L1 of the light string 1, the light emitting element L2 of the light string 2 and the light emitting element L3 of the light string 3 in the light board 324*a*.

Reference is made to FIG. 5 again, the light emitting elements L1, L2 and L3 are arranged in order along a direction from the center of the light board 324 to the outer edge of the light board 324*a*. In other words, the light emitting diode block Bfa used to mount the light emitting elements L1 is a center segment of the light board 324*a*, the light emitting diode block Bf used to mount the light emitting elements L2 is an inner ring segment of the light board 324*a*, and the light emitting diode block Bfn used to mount the light emitting elements L3 is an outer ring of the light board 324*a*.

In some embodiments, the light emitting elements L2, L1 and L3 are arranged in order along a direction from the center of alight board to the outer edge of the light board. In other words, the light emitting elements L2 disposing in a center area of the light board, the light emitting elements L3 disposing in an outer area of the light board, and the light emitting element L1 disposing in a middle area light board which is between the center area and the outer area. As such, the light emitting elements L3 and the light emitting elements L1 surround around the light emitting elements L2. In some embodiments, the overall radiation output of the light emitting elements L3 is greater than the overall radiation output of the light emitting elements L2, and the light without flickering emitted by the light emitting elements L3 surround around the flickering light emitted by the light emitting element L2 can further reduce the human visual perception for the flicker included in the radiation output of the light board. In some embodiments, the number of the light emitting elements L1 is configured to be more than the number of the light emitting elements L2 (such as, the number of the light strings 1[1]~1[*x*] is more than the number of light strings 2[1]~2[*y*]), to increase a ratio of the overall radiation output of the light emitting elements L1 to the overall radiation output of the light emitting elements L2. As such, the variation rage of the radiation output of the light emitting elements L1 can be decreased, and the ratio of the overall radiation output of the light emitting elements L1 to the overall radiation output of the light emitting elements L2 can be increased, in order to further reduce the human visual perception for the flicker. In this case, by arranging the light emitting elements L1 and L3 surrounding around the light emitting elements L2, the flickering light which are hard to be perceived emitted by the light emitting element L1 can surround around the flickering light emitted by light emitting elements L2, in order to further reduce the human visual perception for the flicker included in the radiation output of the light board.

In the other embodiments, the configuration of the light emitting elements L1, L2 and L3 on the light board can be various arrangements. Reference is made to FIG. 8 to FIG. 17 for the configuration of the light emitting elements L1, L2 and L3 on the light board thereof. To be noted that, the embodiments of FIG. 8 to FIG. 17 are illustrations, the light emitting elements L1, L2 and L3 can be configured in the light board by appropriate arrangement, which is not intended to limit the present disclosure.

FIG. 8 to FIG. 17 are schematic diagrams illustrating light boards **324*b*~324*j* in accordance with some embodiments of the present disclosure. In the embodiments of FIG. 8 to FIG. 17, the light emitting diode block Bfa refers to a segment of the light board used to mount the light emitting element L1 emitting the visible flickering light. The light emitting diode block Bf refers to another segment of the light board used to mount the light emitting element L2 emitting the visible flickering light, in which the flickering light emitted by the light emitting element L2 is 180 degrees out of phase in respect to the flickering light emitted by the light emitting element L1. The light emitting diode block Bfn refers to the other segment of the light board used to mount the light emitting element L3 emitting the light without flickering. In some embodiments, the light emitting elements L1, L2 and L3 of each light boards 324*b*~324*j* respectively correspond to the light emitting elements L1, L2 and L3 of the lighting device 300*a*, 300*b* or 300*c***, which is not intend to limit the present disclosure.

Figure 8:
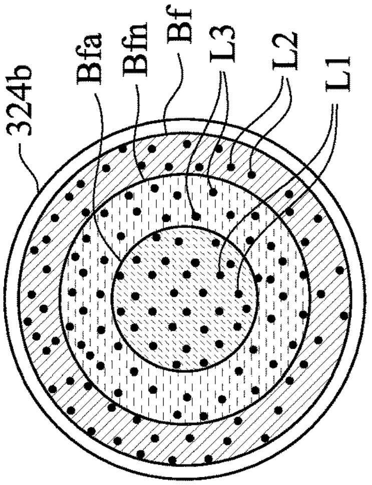

As shown in FIG. 8, the light board **324*b* is a circular light board, and the light emitting elements L1, L3 and L2 are arranged in order along a direction from center of the light board 324*b* to the outer edge of the light board 324*a*. In other words, the light emitting diode block Bfa used to mount the light emitting elements L1 is a center segment of the light board 324*b*. The light emitting diode block Bfn used to mount the light emitting elements L3 is the inner ring of the light board 324*b* and the light emitting diode block Bf used to mount the light emitting elements L2 is an outer ring of the light board 324*b***.

Figure 9:
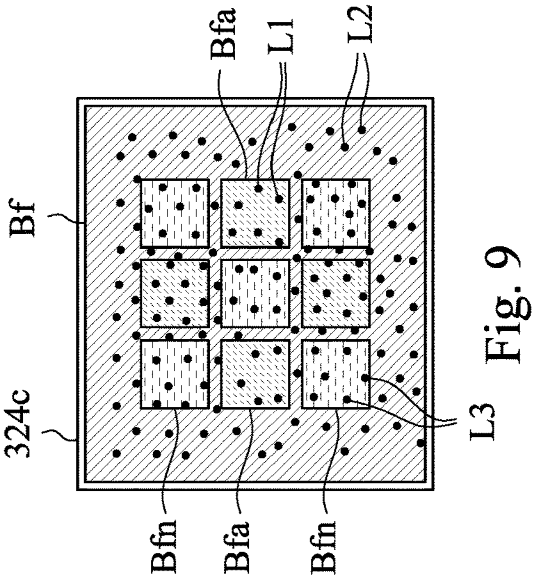
FIG. 8 to FIG. 17 are schematic diagrams illustrating light boards in accordance with some embodiments of the present disclosure.

As shown in FIG. 9, the light board **324*c* is a square light board, the light emitting elements L1 and L3 are arranged in a center area of the light board 324*c* in a checkerboard pattern, and the light emitting elements L2 are disposed in the outer area of the light board 324*c*. That is, the light emitting diode blocks Bfa used to mount the light emitting elements L1 and the light emitting diode blocks Bfn used to mount the light emitting elements L3 are arranged staggered in checkerboard pattern, and light emitting diode blocks Bfa and the light emitting diode block Bfn are surrounded by the light emitting diode block Bf used to mount the light emitting elements L2**.

In some embodiments, the average luminance of the light emitting elements L2 can be decreased, to increase the average luminance of the light emitting elements L1 disposed in the center area, so as to reduce the human visual perception for the flicker produced by the flickering light emitted by the light emitting element L2 changed in the brighter state and darker state. And, by disposing the light emitting elements L3 for emitting the light without flickering surrounding around the light emitting elements L2 can reduce the pressure on the human visual system caused from the flicker stimulation.

In some embodiments, the average luminance of the light emitting elements L2 can be increased, to increase the stimulation of flickering light emitted by the light emitting elements L2, thereby improving the effectiveness of specific treatment/prevention of specific diseases/symptoms. And, by disposing the light emitting elements L3 for emitting the light without flickering surrounding around the light emitting elements L2 can reduce the pressure on the human visual system caused form the flicker stimulation.

Figure 10:
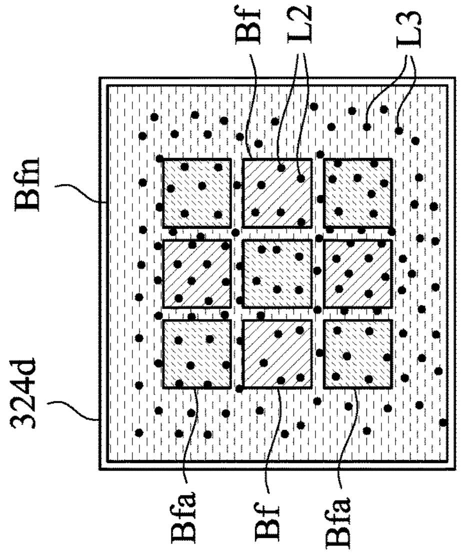

As shown in FIG. 10, the light board **324*d* is a square light board, the light emitting elements L1 and L2 are arranged staggered in center area of the light board 324*c* in checkerboard pattern, and the light emitting elements L3 are disposed in the outer area of the light board 324*d*. That is, the light emitting diode block Bfa used to mount the light emitting elements L1 and the light emitting diode block Bf used to mount the light emitting elements L2 are arranged staggered in center area of the light board 324*c*, and the light emitting diode block Bfa and the light emitting diode block Bf are surrounded by the light emitting diode block Bfn used to mount the light emitting elements L3**.

Figure 11:
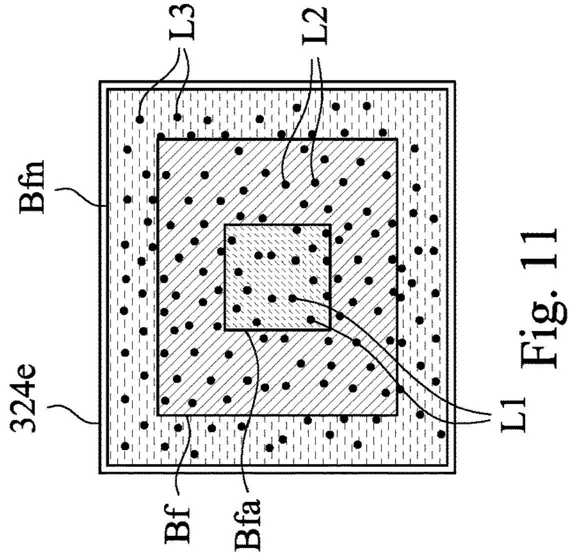

As shown in FIG. 11, the light board **324*e* is a square light board, and the light emitting elements L1, the light emitting elements L2 and the light emitting elements L3 are arranged in order along a direction from a center of the light board 324*e* to an outer edge of the light board 324*e*. In other words, the light emitting diode block Bfa used to mount the light emitting elements L1 is a center segment of the light board 324*e*. The light emitting diode block Bf used to mount the light emitting elements L2 is an inner ring of the light board 324*e*, and the light emitting diode block Bfn used to mount the light emitting elements L3 is a outer ring of the light board 324*e***.

In some embodiments, the arrangement of the light emitting diode block Bfn for emitting the light without visible flickering surrounding around the light emitting diode block Bf and/or Bfa for emitting flickering light results in the light without visible flickering surrounding around the flickering light. As such, the perception of human visual system for the flickering light emitting by the light emitting diode block Bf and/or Bfa can be reduced, in order to reduce the pressure on the human visual system caused form the flickering light.

Figure 12:
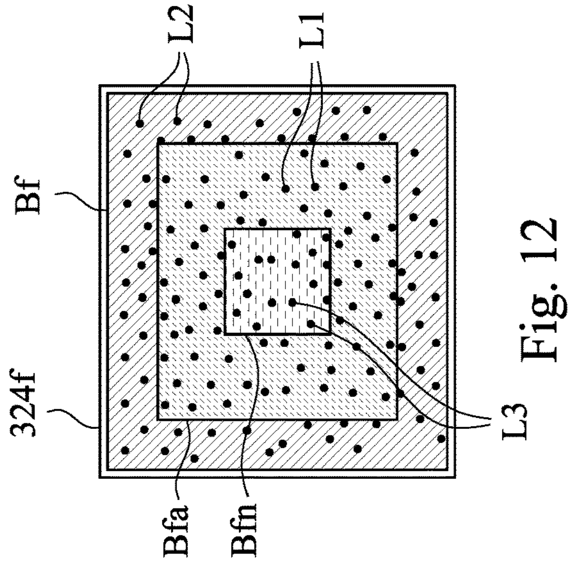

As shown in FIG. 12, the light board **324*f* is a square light board, and the light emitting elements L3, the light emitting elements L1 and the light emitting elements L2 is arranged in order along a direction from a center of the light board 324*f* to an outer edge of the light board 324*f*. In other words, the light emitting diode block Bfn used to mount the light emitting elements L3 is a center segment of the light board 324*f*. The light emitting diode block Bfa used to mount the light emitting elements L1 is an inner ring of the light board 324*f*, and the light emitting diode block Bf used to mount the light emitting elements L2 is an outer ring of the light board 324*f***.

Figure 13:
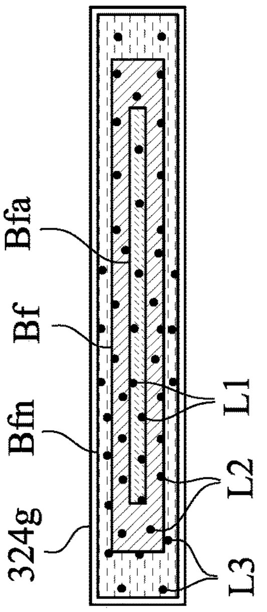

As shown in FIG. 13, the light board **324*g* is a rectangular light board, and an arrangement of the light emitting elements L1, the light emitting elements L2 and the light emitting elements L3 of the light board 324*g* is similar to the an arrangement of the light emitting elements L1, the light emitting elements L2 and the light emitting elements L3 of the light board 324*e***, the description is omitted here.

Figure 14:
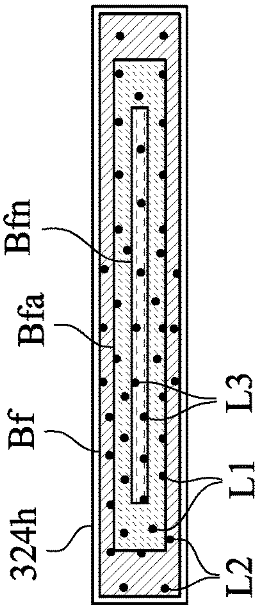

As shown in FIG. 14, the light board **324*h* is a rectangular light board, and an arrangement of the light emitting elements L1, the light emitting elements L2 and the light emitting elements L3 of the light board 324*h* is similar to an arrangement of the light emitting elements L1, the light emitting elements L2 and the light emitting elements L3 of the light board 324*f***, the description is omitted here.

Figure 15:
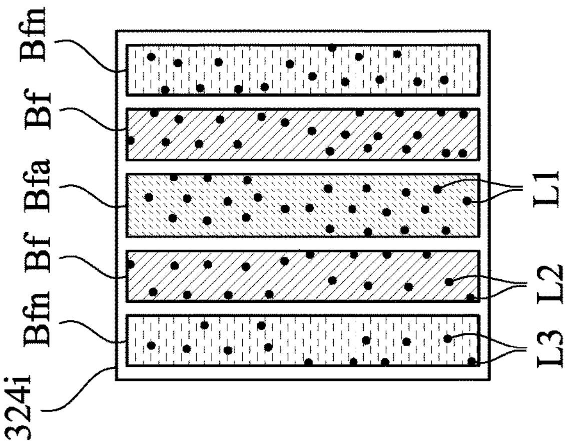

As shown in FIG. 15, the light board **324*i* is a rectangular light board, the light emitting elements L1, the light emitting elements L2 and the light emitting elements L3 are arranged staggered on the light board 324*i* in a line interlaced pattern. That is, the light emitting diode block Bfa used to mount the light emitting elements L1, the light emitting diode block Bf used to mount the light emitting elements L2 and the light emitting diode block Bfn used to mount the light emitting elements L3** are arranged staggered in a line interlaced pattern.

Figure 16:
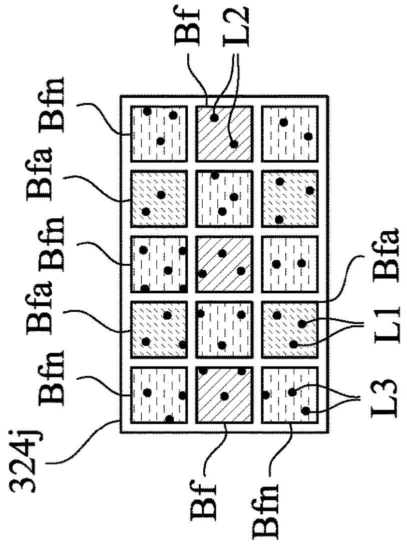

As shown in FIG. 16, the light board **324*j* is a rectangular light board, the light emitting elements L1, the light emitting elements L2 and the light emitting elements L3 are arranged staggered on the light board 324*k* in a checkerboard pattern. That is, the light emitting diode block Bfa used to mount the light emitting elements L1, the light emitting diode block Bf used to mount the light emitting elements L2 and the light emitting diode block Bfn used to mount the light emitting elements L3** are arranged staggered in a checkerboard pattern.

Figure 17:
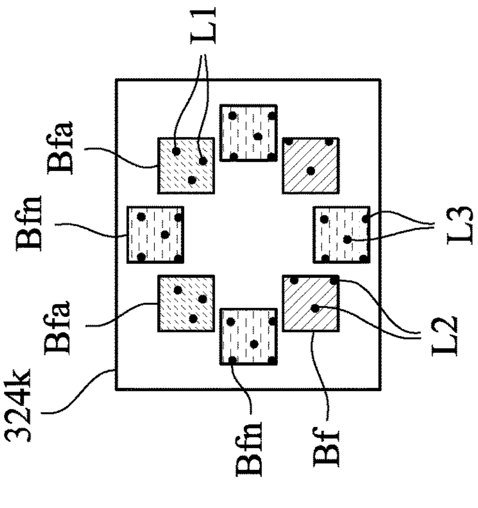

As shown in FIG. 17, the light board **324*k* is a square light board, the light emitting elements L1, the light emitting elements L2 and the light emitting elements L3 are arranged staggered on the light board 324*k* in a honeycomb pattern. That is the light emitting diode block Bfa used to mount the light emitting elements L1, the light emitting diode block Bf used to mount the light emitting elements L2 and the light emitting diode block Bfn used to mount the light emitting elements L3** are arranged staggered in a honeycomb pattern.

Summary, the present disclosure provides a lighting device 200 capable for controlling a pulse frequency of the pulsating direct current $I_{p2}$ provided to the light string 2, such that the light string 2 emits the flickering light to achieve the specific requirement (such as, treatment, prevent or improve the specific disease or symptoms). Furthermore, since the DC driving current $I_{dri}$ is a constant current which is divided into the pulsating direct currents $I_{p1}$ and t $I_{p2}$, the pulsating direct current $I_{p1}$ flowing through the light string 1 is 180 degrees out of phase in respect to the pulsating direct current $I_{p2}$, thereby driving the light string 1 by the pulsating direct current $I_{p1}$ can reduce the human visual perception for the flicker produced by the light string 2. And, the present disclosure provides the lighting devices 300, **300*a*~300*c* further including the light string 3 driven by the DC driving current $I_{dri}$ for emitting the light without the visible flickering, so as to reduce the human visual perception for the flicker produced by the light string 2**, and to reduce the pressure on the human visual system caused from the flicker stimulation.

Although specific embodiments of the disclosure have been disclosed with reference to the above embodiments, these embodiments are not intended to limit the disclosure. Various alterations and modifications may be performed on the disclosure by those of ordinary skills in the art without departing from the principle and spirit of the disclosure. Thus, the protective scope of the disclosure shall be defined by the appended claims.

What is claimed is:

1. A lighting device, comprising:

a driving power source, configured to provide a DC driving current to a shunt node;

a first light string, electrically coupled between the shunt node and a ground terminal, configured to be driven by a first pulsating direct current;

a second light string, electrically coupled to the shunt node, configured to be driven by a second pulsating direct current;

a constant current controller, wherein the second light string and the constant current controller are electrically coupled between the shunt node and the ground terminal; and a pulse width modulation controller, configured to provide a pulse signal to the constant current controller, and wherein the constant current controller is configured to control a pulse frequency of the second pulsating direct current provided to the second light string according to the pulse signal, wherein the driving power source controls an amplitude of the DC driving current, wherein the constant current controller is further configured to control a maximum amplitude and a minimum amplitude of the second pulsating direct current, and wherein an amplitude of the first pulsating direct current depends on the DC driving current and the second pulsating direct current.

2. The lighting device of claim 1, wherein the pulse frequency of the first pulsating direct current corresponds to the pulse frequency of the second pulsating direct current.

3. The lighting device of claim 1, wherein the pulse frequency of the second pulsating direct current is set at a desired frequency.

4. The lighting device of claim 1, wherein the pulse frequency of the second pulsating direct current is less than 80 Hz.

5. The lighting device of claim 1, wherein the pulse frequency of the second pulsating direct current is set at 40 Hz.

6. The lighting device of claim 1, wherein the first pulsating direct current is 180 degrees out of phase in respect to the second pulsating direct current, and wherein the maximum amplitude and the minimum amplitude of the second pulsating direct current is set in a range of 0~1 times of the amplitude of the DC driving current.

7. The lighting device of claim 1, further comprising a light board, wherein a plurality of first light elements of the first light string and a plurality of second light elements of the second light string are arranged on the light board, wherein the first light elements are disposed in an outer area of the light board, and wherein the second light elements are disposed in a center area of the light board.

8. The lighting device of claim 1, further comprising a light board, wherein a plurality of first light elements of the first light string and a plurality of second light elements of the second light string are arranged staggered on the light board.

9. The lighting device of claim 1, further comprising a light board, wherein a plurality of first light elements of the first light string and a plurality of second light elements of the second light string are arranged staggered on the light board in a checkerboard pattern.

10. The lighting device of claim 1, further comprising:

a third light string, electrically coupled between the driving power source and the shunt node, configured to be driven by the DC driving current.

11. The lighting device of claim 10, wherein the third light string is configured to be driven by the DC driving current to emit light without flickering.

12. The lighting device of claim 10, further comprising a light board, wherein a plurality of first light emitting elements of the first light string, a plurality of second light emitting elements and a plurality of third light emitting elements are disposed in the light board, and the second light emitting elements, the first light emitting elements and the third light emitting elements are sequentially arranged along a direction from the center of the light board to an outer edge of the light board.

13. The lighting device of claim 10, further comprising a light board, wherein a plurality of third light emitting elements of the third light string are arranged in an outer area of the light board, and wherein a plurality of first light emitting elements of the first light string and a plurality of second light emitting elements of the second light string are arranged staggered on a center area of the light board in a checkerboard pattern.

14. The lighting device of claim 10, further comprising a light board, wherein a plurality of first light emitting elements of the first light string, a plurality of second light emitting elements of the second light string and a plurality of third light emitting elements of the third light string are arranged staggered on the light board in a checkerboard pattern.

15. The lighting device of claim 1, wherein a ratio of a radiation output of the first light string to a radiation output of the second light string is in a range between 1 to 1 and 100 to 1.

16. The lighting device of claim 1, wherein the DC driving current is a constant current, and wherein the first pulsating direct current and the second pulsating direct current are divided from the constant current.

17. The lighting device of claim 1, wherein the first light string is configured to be driven by the first pulsating direct current to emit first flickering light, wherein the second light string is configured to be driven by the second pulsating direct current to emit second flickering light, and wherein phase of the first flickering light is different from phase of the second flickering light.

18. The lighting device of claim 17, wherein the first flickering light is 180 degrees out of phase in respect to the second flickering light.

19. The lighting device of claim 17, wherein a low frequency of the second flickering light emitted by the second light string is perceptible by human visual system.

* * * * *